Feb. 13, 1951   J. MIHALYI   2,541,476
LIGHT-TIGHT FILM CARTRIDGE
Filed Oct. 12, 1949

JOSEPH MIHALYI
INVENTOR
BY
ATTORNEYS

Patented Feb. 13, 1951

2,541,476

UNITED STATES PATENT OFFICE 2,541,476

LIGHT-TIGHT FILM CARTRIDGE

Joseph Mihalyi, Rochester, N. Y., assignor to Eastman Kodak Company, Rochester, N. Y., a corporation of New Jersey Application October 12, 1949, Serial No. 121,041

9 Claims. (Cl. 242—71)

This invention relates to light-tight film cartridges which are made of inexpensive parts and materials. One object of my invention is to provide a photographic film spool which is so arranged that parallel flanges are permitted to move a short distance in parallelism during the winding and unwinding of film therefrom. Another object of my invention is to provide a film cartridge which can be readily assembled by relatively inexperienced help. A further object of my invention is to provide a film spool cartridge which may consist of two relatively slideable film spool sections, a stretchable paster, and a length of film. Other objects will appear in the following specification, the novel features being particularly pointed out in the claims at the end thereof.

It has been particularly difficult to produce a satisfactory light-tight film cartridge for use with a length of film having an opaque backing and omitting the usual film backing paper, since it is necessary to obtain a light-tight joint between the edges of the film and the film spool flanges. Flanges having beads around their peripheries are known, but in very narrow sizes it is frequently difficult to pass the film to and from the inside of these beads and to have the inside flanges come close to the convolutions of film after they have been wound on the film spool hub.

Film spools having flexible cores are broadly old as shown in U. S. Patents Nos. 2,346,075, Mihalyi, April 4, 1944, and 2,362,577, Mihalyi and Scott, November 14, 1944. When properly made, such spools are quite satisfactory, but, unfortunately, they are also quite expensive. In order to provide a hub which tends to return to a standard position by slotting the hub, as shown in these patents, the metal and perforating must be carefully done, and, in addition, it is difficult to maintain strict parallelism between the flanges. While this can be done in the first-mentioned patent, it requires considerable care to produce the correct sliding fit between the inner and outer hub members. This, too, is expensive.

In my present invention I have overcome these difficulties by making a film spool out of two inexpensive molded sections, and by retaining these sections in a normal position with the flanges in fixed relationship by means of a resilient paster. The flanges are held in parallelism by the core sections and the film may be attached by the same resilient paster which holds the core sections together.

Coming now to the drawings wherein like reference characters denote like parts throughout:

Figure 3:
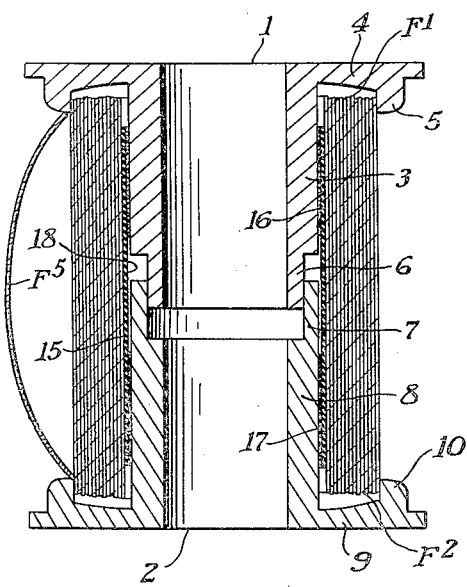
Fig. 3 is a transverse section through my improved form of film cartridge showing the position the spool sections assume as film is being passed between the beads on the spool flanges.
Figure 4:
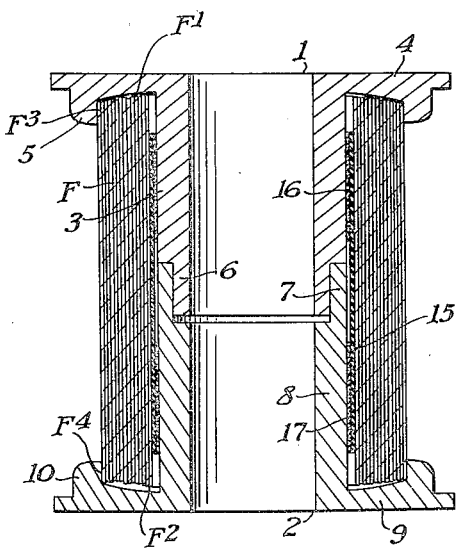
Fig. 4 is a view similar to Fig. 3, but with the film lying totally inside of the beads on the flanges.

The dimensions of the spools shown in the drawings are somewhat exaggerated to give a better idea of the action of the spool, and, while the difference between the flange separation in Figs. 3 and 4 is shown to be fairly great, actually it is only necessary for the flanges to separate a comparatively slight distance, such, for instance, as a thirty-second of an inch, where the film cartridge is designed to take films 20 millimeters in width.

My invention consists broadly in providing two spool sections having mating areas permitting one section to slide axially of the other a short distance; these sections normally being held together by a flexible paster, such as rubber, Koroseal, or the like; this paster having strips of adhesive along opposite edges, one area adhering to one spool section, the other area adhering to the other spool section, with the area free from adhesive lying over the mating areas of the spool sections. The ends of this resilient paster are used to attach a film.

More specifically, the film cartridge may consist of a spool having sections 1 and 2. Each of these sections is similar in shape, one being right-handed and the other being left-handed. Section 1 includes a hub section 3 having a flange 4 affixed to one end. This flange preferably includes a bead 5 extending around the periphery. Hub section 3 likewise includes a mating portion 6 which, in this instance, is a cylindrical portion having a free sliding fit with a cylindrical portion 7 of the spool section 2. The cylindrical portion 7 is formed in the end of a hub section 8 which includes a flange 9 on the outer end thereof; this flange also having a bead 10 extending inwardly. The normal position of the beads 5 and 10 is indicated in Fig. 4 wherein the film edges F—1 and F—2 lie close to the inside walls of the flange. When the film "F" is completely wound on the film spool cartridge, the spool sections are as shown in Fig. 4 with the flanges 4 and 9 in parallel relation and with the outer edges F—3 and F—4 of the film lying adjacent the insides of the beads 5 and 10, as shown. When film is wound to or from the film spool hub sections 3 and 8, the film becomes bowed, as shown at F—5 in Fig. 3, and the outer edges of the film may tend to separate the flanges 5 and 10 a short distance to permit the film to bow and pass to and from the flanges more readily. As above explained, the difference in the flange spacing is usually very slight, and the spacing of the flanges 4 and 9 is consequently changed but little, while the parallelism of the flanges is maintained by the free sliding fit between the mating areas 6 and 7 of the hub sections.

Figure 1:
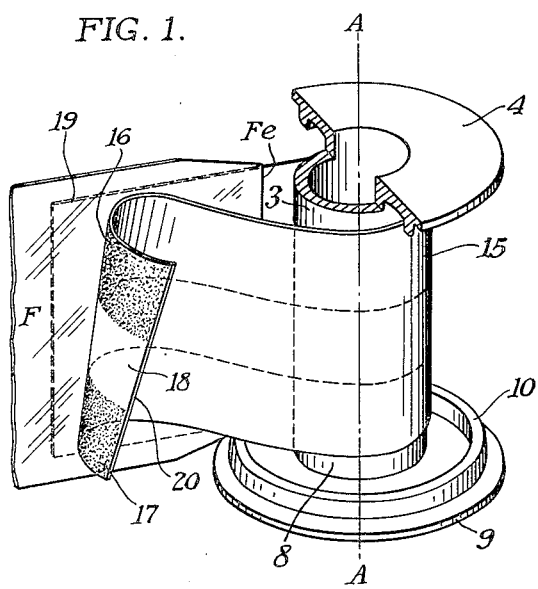
Fig. 1 is a perspective view, partially broken away, of a film cartridge constructed in accordance with and embodying a preferred form of my invention, a portion of the paster being shown before it is pressed into adherence with the film.
Figure 2:
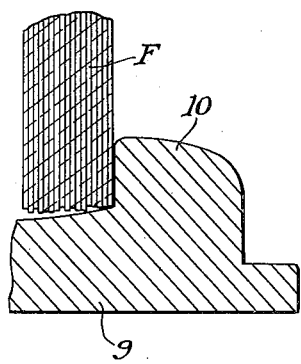
Fig. 2 is an enlarged detail fragmentary section through a portion of a film spool flange and showing convolutions of film lying thereagainst.

The slight sliding movement required is obtained in the following manner. A paster 15 is provided for fastening the hub sections 3 and 8 together; this paster being made of resilient material, such as rubber, Koroseal, or the like. The paster is provided with two parallel strips of adhesive 16 and 17 separated by an area 18 which is free from adhesive. The adhesive may be of the "surgeon's tape" variety in which pressure, or pressure and heat, causes the adhesive to adhere. In assembling the film cartridge, the hub sections 3 and 8 are held so that their mating sections 6 and 7 are completely telescoped, as shown in Fig. 4. The paster 15 is passed around the hub, as shown in Fig. 1, pressing on one strip of parallel adhesive 16 to adhere this strip to the upper section, or hub section 3. The paster may then be pulled slightly towards the flange 9 and the adhesive strip 17 pressed against the core section 8, so that the resilient paster 15 exerts a slight pressure tending to hold the hub sections together. This paster may be solely used for holding the spool sections together, but I have found that only partial contact with the paster 15 around the hub sections is all that is required to hold the spool sections together, so that I prefer to use the two ends of the paster 19 and 20 to attach the film "F." This may be done by merely pressing the ends 20 and 19 against the film "F" to hold the end to the hub sections 3 and 8. Suitable precautions should be taken to bring the film "F" at right angles to the axis "A" of the film spool during this loading operation, and this can be readily done with a jig, or other suitable fixture.

The above-described construction has many advantages. First, the molded spool sections are extremely inexpensive and the free sliding fit between the cylindrical sections 6 and 7 can be readily maintained so that the flanges 4 and 9 will not vary materially from a parallel position at the utmost extension of the hub, as indicated in Fig. 3. Second, the paster 15 is inexpensive and not only performs satisfactorily to hold the film spool sections together, but, in addition, it makes a desirable means of attaching the film to the spool. Since the paster is flexible, it permits some movement between the end "Fe" of the film and the hub tending to permit some adjustment of the film as it is first moved onto the film spool. Third, it reduces the total number of parts in the complete film cartridge to a minimum—that is, two spool sections, one resilient paster and one film—consequently, the total cost of the film cartridge is materially reduced. Fourth, it can be readily assembled by comparatively unskilled help.

Since film cartridges are usually "dated," that is, a date of one or two years from the time of manufacture is placed on the film, according to the type of film, to determine its life in first-class condition, I have not found any deterioration of the rubber or Koroseal paster occurring during this short period which affects the action of the film spool flanges. In addition, the resilient paster exerts only a very light pressure on the film spool sections so that what separation of the flanges does occur is under comparatively light pressure, and there is no tendency to mar or damage the lateral edges of the film as they pass between the beads 5 and 10.

It will thus be seen that there is provided a simple device in which the several objects of this invention are achieved and which is well adapted to meet the conditions of practical use.

As various embodiments are possible and may be readily made, and as various changes may be made from the embodiments set forth by way of illustration, it is to be understood that all the material herein set forth or shown in the accompanying drawings is to be interpreted as illustrative only and not in a limiting sense.

Having thus described my invention, what I claim is new and desire to secure by Letters Patent of the United States is:

1. A film cartridge comprising a two-part spool including two hub sections, flanges on each hub section, an interfitting axially slideable section on each hub section movable relative to each other to vary the separation of the spool flanges, and a resilient stretchable paster adhering to and at least partially encircling each hub section and exerting a force tending to move the flanges and hub sections together.

2. A film cartridge comprising a two-part spool including two hub sections, flanges on each hub section, an interfitting axially slideable section on each hub section movable relative to each other to vary the separation of the spool flanges, and a resilient stretchable paster adhering to and at least partially encircling each hub section and exerting a force tending to move the flanges and hub sections together, and a film attached to the hub by the resilient stretchable paster.

3. A film cartridge comprising a two-part spool including two hub sections, flanges on each hub section, an interfitting axially slideable section on each hub section movable relative to each other to vary the separation of the spool flanges, and a resilient stretchable paster adhering to and at least partially encircling each hub section and exerting a force tending to move the flanges and hub sections together, and a film attached to the hub by the resilient stretchable paster, said paster having an adhesive positioned in parallel bands separated by a band free from adhesive.

4. A film cartridge comprising a two-part spool including two hub sections, flanges on each hub section, an interfitting axially slideable section on each hub section movable relative to each other to vary the separation of the spool flanges, and a resilient stretchable paster adhering to and at least partially encircling each hub section and exerting a force tending to move the flanges and hub sections together, and a film attached to the hub by the resilient stretchable paster, said paster having an adhesive positioned in parallel bands separated by a band free from adhesive, one adhesive area being attached to one hub section, the other adhesive area being attached to the other hub section, the area free from adhesive lying over the interfitting axially slideable hub sections to permit said last-mentioned paster area to stretch.

5. A film cartridge comprising a two-part spool including two hub sections, flanges on each hub section, an interfitting axially slideable section on each hub section movable relative to each other to vary the separation of the spool flanges, and a resilient stretchable paster adhering to and at least partially encircling each hub section and exerting a force tending to move the flanges and hub sections together, the interfitting axial slideable sections of each hub section including means for restraining other than axial movements of the hub sections to maintain the flanges in parallel relationship.

6. A film cartridge comprising a film spool composed of two sections, each including a core section and flange, the two core sections having mating areas in slideable contact, a resilient paster at least partially engaging and adhesively secured to the core sections and tending to hold the core sections together, the outer periphery of the flanges lying closer together than the remainder thereof, and a film adapted to be wound on the core of greater width than the spacing between outer peripheries of the core flanges, said film being also attached to the core sections by the paster.

7. The film cartridge construction defined in claim 6 characterized in that the mating areas in slideable contact maintaining the flanges in parallel relationship.

8. The film cartridge construction defined in claim 6 characterized in that the paster at least partially engaging and adhesively secured to the core sections having adhesive along each outer edge parallel to the flanges and an area free from adhesive therebetween.

9. The film cartridge construction defined in claim 6 characterized in that the film is resiliently attached to the two-part hub by means of the resilient paster which holds the spool core sections together.

JOSEPH MIHALYI.

No references cited.